United States Patent
Bansal et al.

(10) Patent No.: US 10,536,383 B2
(45) Date of Patent: Jan. 14, 2020

(54) ATTRIBUTE ENHANCEMENT FOR HANDLING NETWORK PACKET TRAFFIC BETWEEN MICRO SEGMENTED GUESTS

(71) Applicant: Nicira, Inc., Palo Alto, CA (US)

(72) Inventors: Kaushal Bansal, Sunnyvale, CA (US); Sunitha Krishna, Saratoga, CA (US); Jerry Pereira, Santa Clara, CA (US); Shadab Shah, Sunnyvale, CA (US); Subrahmanyam Manuguri, San Jose, CA (US); Jayant Jain, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/708,352

(22) Filed: Sep. 19, 2017

(65) Prior Publication Data
US 2019/0089635 A1  Mar. 21, 2019

(51) Int. Cl.
*H04L 12/815* (2013.01)
*H04L 12/801* (2013.01)

(52) U.S. Cl.
CPC .............. *H04L 47/22* (2013.01); *H04L 47/19* (2013.01)

(58) Field of Classification Search
CPC combination set(s) only.
See application file for complete search history.

(56) References Cited

U.S. PATENT DOCUMENTS

| 6,678,835 | B1* | 1/2004 | Shah | H04L 12/4641 |
| | | | | 714/4.12 |
| 7,558,863 | B1* | 7/2009 | Sitaraman | H04L 12/2856 |
| | | | | 709/228 |
| 2011/0149964 | A1* | 6/2011 | Judge | H04L 45/04 |
| | | | | 370/392 |
| 2014/0201375 | A1* | 7/2014 | Beereddy | H04L 47/70 |
| | | | | 709/226 |
| 2014/0219276 | A1* | 8/2014 | Jokinen | H04L 47/62 |
| | | | | 370/392 |
| 2017/0063933 | A1* | 3/2017 | Shieh | H04L 63/20 |
| 2017/0163666 | A1* | 6/2017 | Venkatramani | H04L 63/0272 |
| 2017/0339188 | A1* | 11/2017 | Jain | H04L 63/0428 |
| 2018/0063195 | A1* | 3/2018 | Nimmagadda | H04L 63/20 |
| 2018/0139150 | A1* | 5/2018 | Jain | H04L 47/765 |
| 2018/0183757 | A1* | 6/2018 | Gunda | G06F 9/45558 |

* cited by examiner

*Primary Examiner* — Xavier Szewai Wong (57) ABSTRACT

The technology disclosed herein enables the enhancement of attributes used to identify network packet traffic exchanged with micro segmented guests. In a particular embodiment, a method provides receiving a plurality of attributes from a user. The plurality of attributes describes first network packet traffic that should be handled in a first manner. The method further provides processing network packet traffic to identify the first network packet traffic using the plurality of attributes. While processing the network packet traffic, the method provides identifying one or more additional attributes shared among the first network packet traffic and adding at least a portion of the one or more additional attributes to the plurality of attributes.

16 Claims, 7 Drawing Sheets

ATTRIBUTE ENHANCEMENT FOR HANDLING NETWORK PACKET TRAFFIC BETWEEN MICRO SEGMENTED GUESTS

TECHNICAL BACKGROUND

Micro segmentation is used to logically divide networked endpoints into groups. The groups created by micro segmentation allow for the application of different policies to network packet traffic being exchanged with network elements within each group. Micro segmentation is primarily implemented in virtualized computing environments where host computing systems host guests that are networked. A guest may include a guest operating system executing within a virtual machine, a containerized application, such as one implemented with Docker® technology available from Docker, Inc., or some other form of virtualizing a computing element hosted by a host computing system—including combinations thereof. Implementing micro segmentation in host computing systems allows each guest on a host computing system to be placed in a different micro segmentation group if necessary or desired. The host computing system therefore handles packets being exchanged with the respective guests in accordance with the network policies of each guest's associated micro segmentation group.

The application of network policies to different micro segmentation groups is achieved by defining attributes for packet traffic exchanged with networked endpoints in the group. The attributes may be information explicitly provided for in the packet header, such as source and/or destination network addresses, where the information can easily be read from the packet. The attributes may also be found in other data of the packet, including the packet's payload, which allows for packets to be identified based on a relatively large number of attributes. As such, when a user defines attributes for packet traffic of one micro segmentation group, some attributes that would be relevant to that group may be overlooked or unknown to the user.

SUMMARY

The technology disclosed herein enables the enhancement of attributes used to identify network packet traffic exchanged with micro segmented guests. In a particular embodiment, a method provides receiving a plurality of attributes from a user. The plurality of attributes describes first network packet traffic that should be handled in a first manner. The method further provides processing network packet traffic to identify the first network packet traffic using the plurality of attributes. While processing the network packet traffic, the method provides identifying one or more additional attributes shared among the first network packet traffic and adding at least a portion of the one or more additional attributes to the plurality of attributes.

In some embodiments, the method provides, after adding at least the portion of the one or more additional attributes to the plurality of attributes, continuing to process the network packet traffic to identify the first network packet traffic using the plurality of attributes.

In some embodiments, the method provides presenting the one or more additional attributes to the user and receiving a selection from the user indicating at least the portion of the one or more attributes.

In some embodiments, the one or more additional attributes comprise attributes in the application layer of the first network packet traffic and the plurality of attributes, when received from the user, include attributes in a layer of the first network packet traffic lower than the application layer.

In some embodiments, the first network packet traffic is associated with one or more applications. In those embodiments, the plurality of attributes, when received from the user, may include an application identifier for each of the one or more applications. The application identifier may comprise an identifier of one or more protocols used for the first network packet traffic, wherein one or more protocols include one or more of Secure Sockets Layer (SSL), Secure Shell (SSH), Domain Name System (DNS) protocol, and Dynamic Host Configuration Protocol (DHCP). The one or more additional attributes may include one or more of a cipher suite and a security certificate.

In some embodiments, the method further provides using a portion of the one or more additional attributes to identify second network packet traffic that should be handled in a second manner different than the first manner. In those embodiments, the first manner may comprise allowing passage through a network firewall and the second manner may comprise denying passage through the network firewall.

In another embodiment, a system is provided having one or more computer readable storage media and a processing system operatively coupled with the one or more computer readable storage media. Program instructions stored on the one or more computer readable storage media, when read and executed by the processing system, direct the processing system to receive a plurality of attributes from a user. The plurality of attributes describes first network packet traffic that should be handled in a first manner. The program instructions further direct the processing system to process network packet traffic to identify the first network packet traffic using the plurality of attributes. While the network packet traffic is processed, the program instructions direct the processing system to identify one or more additional attributes shared among the first network packet traffic and add at least a portion of the one or more additional attributes to the plurality of attributes.

DETAILED DESCRIPTION

The implementations described herein provide the ability to identify and add additional packet attributes to packet attributes used for handling packets exchanged with micro segmented guests. The additional attributes may be attributes that were not known, or could not be known, to the user at the time of initial attribute definition or may have been omitted from the user provided attributes for some other reason. Regardless of the reason for not being included in the user provided attributes, the additional attributes are determined herein based on the processing of network packet traffic using the user provided attributes. For example, the user provided attributes may indicate that certain network traffic packets belong to a first micro segmentation group. Those packets may be further analyzed during processing to identify other attributes that the packets have in common and those other attributes may be then added to the attributes used to identify packets of the first micro segmentation group. The more attributes that are added to a definition of a particular micro segmentation group, the less likely a packet will be misidentified. Thus, the likelihood of a packet being mishandled due to being misidentified is also reduced.

Figure 1:
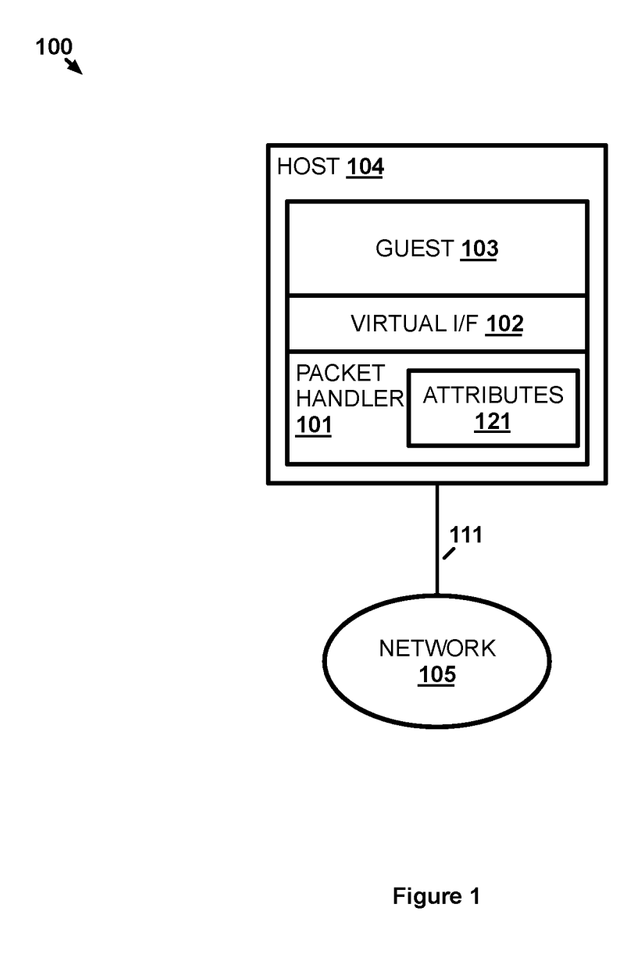
FIG. 1 illustrates an implementation for enhancing the attributes used for handling packets exchanged with micro segmented guests.

FIG. 1 illustrates implementation 100 for enhancing the attributes used for handling packets exchanged with micro segmented guests. Implementation 100 includes packet handler 101, virtualized interface 102, guest 103, host 104, and network 105. Host 104 in this example includes hardware (e.g., microprocessor(s), memory, storage, physical network interface(s), etc.) and software (e.g., hypervisor) necessary to provide a virtualized computing system (e.g., virtual machine) on which guest 103 executes. Network 105 comprises a physical computer network and may include switches, routers, firewalls, or any other type of networking equipment—including combinations thereof. Host 104 communicates with network 105 over communication link 111.

In operation, packet handler 101 processes packets being exchanged with guest 103. Essentially, any packets passing into and out of virtualized interface 102 are processed by packet handler 101. The processing and handling of the packets by packet handler 101 may be performed as part of a network firewall function (or other network security function), a network quality of service function, or some other packet processing function—including combinations thereof. Packet handler 101 uses attributes 121 to identify packets that should be handled in accordance with a network traffic policy. Attributes 121 may be specific to one network policy or may include attributes for multiple policies. For example, a network policy may indicate that only traffic having certain attributes 121 should be allowed into guest 103 via virtualized interface 102. Guest 103 may be micro segmented into a particular group of guests that share the aforementioned network policy or may be the only guest in that micro segmentation group. Packet handler 101, therefore, processes network packet traffic to identify packets with attributes 121 and allows that packet traffic through while blocking all other packet traffic directed to guest 103. Since there may be additional attributes that describe the packets that packet handler 101 should allow to pass in the above example, packet handler 101 is capable of identifying additional attributes that describe the packets to enhance attributes 121. The additional attributes decrease the likelihood that unwanted packet traffic will pass through packet handler 101 because those packets coincidentally, or maliciously, had the non-enhanced attributes 121.

Figure 2:
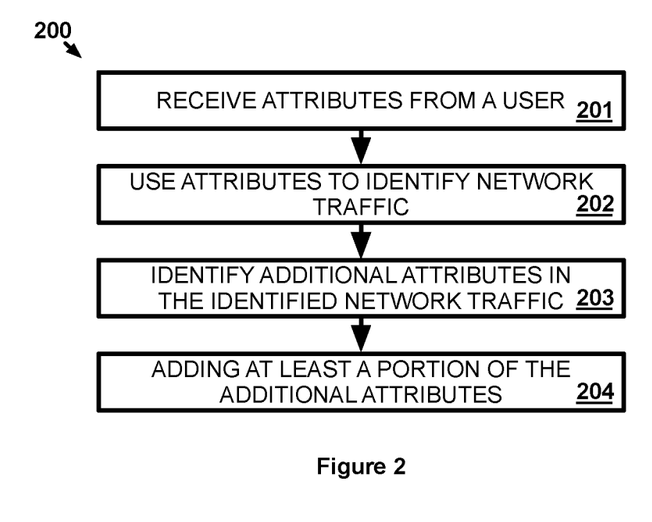
FIG. 2 illustrates a scenario for the implementation to enhance the attributes used for handling packets exchanged with micro segmented guests.

FIG. 2 illustrates scenario 200 for implementation 100 to enhance the attributes used for handling packets exchanged with micro segmented guests. In scenario 200, packet handler 101 receives attributes 121 from a user (201). Attributes 121 may be received over network 105 from a workstation operated by the user. In some cases, a packet handler manager may receive attributes 121 from the user before passing attributes 121 to packet handler 101, which may be one of multiple packet handlers on host 104 and/or other hosts that are also managed by the packet handler manager and connected via network 105. The packet handler manager itself may be a guest on host 104 or on another host, or may be a physical computing system. In this example, attributes 121 describe packet traffic that should be handled by packet handler 101 in a particular manner. For example, attributes 121 may describe packet traffic that should be allowed to enter guest 103 via virtualized interface 102. Other manners of handling the identified packet traffic may instead be used, such as blocking or prioritizing the identified packet traffic, as may be identified by a network policy for guest 103's corresponding micro segmentation group. Attributes 121 may include an identifier for an application that transfers packets, a source address for packets, a protocol used by the packets—such as Secure Sockets Layer (SSL), Transport Layer Security (TLS), Domain Name System (DNS), Dynamic Host Configuration Protocol (DHCP), or some other type of protocol—descriptors specific to the protocol used by the packets, such as a version number or certificate, or any other information that may distinguish one packet over another.

Scenario 200 then provides packet handler 101 processing network packet traffic exchanged with guest 103 via virtualized interface 102 to identify the network packet traffic described by attributes 121 (202). All packets of the network packet traffic exchanged with guest 103 may be processed for the purposes of identifying additional attributes or only a portion of the packets may be processed (e.g., to conserve processing resources). Packets identified during this processing may be handled in accordance with a policy associated with attributes 121. While processing the network packet traffic, packet handler 101 identifies one or more additional attributes shared by the identified packets (203). The additional attributes may include any attribute descriptive of the identified packets that is not already included in attributes 121. Preferably, the additional attributes include attributes of the identified packets that distinguish the identified packets from other network packets. The additional attributes may be attributes discovered by packet handler 101 at any level of the open systems interconnect (OSI) network model from the network layer, layer 3 (L3), up to the application layer, layer 7 (L7). To identify attributes at the higher of those network layers, deep packet inspection (DPI) may be used by packet handler 101. Packet handler 101 itself may perform the DPI or may interact with another packet handler on host 104 that performs the DPI.

Packet handler 101 adds at least a portion of the additional attributes to attributes 121 (204). In some examples, all of the additional attributes are added to attributes 121. In other examples, criteria may be used to determine which of the additional attributes should be added to attributes 121. For instance, a threshold percentage of the identified packets (e.g., at least 95%) may be required to have a particular additional attribute before that attribute is added to attributes 121. Similarly, in some cases, a threshold number of packets must be processed to identify additional attributes before an attribute is considered viable for inclusion in the additional attributes (i.e., to ensure a large enough sample size has been considered). In further examples, a user may indicate which of the additional attributes should be added to attributes 121. The user may be the same user that initially supplied attributes 121 or may be another user. Packet handler 101 may transfer the additional attributes to the user's workstation (or other device), which will present the additional attributes to the user for review and accept input from the user indicating which of the additional attributes should be added to attributes 121. The packet handler 101 is notified of the user's selections and adds the additional attributes to attributes 121 in accordance with those selections.

In one example, packet handler 101 identifies the additional attributes by creating a table, or other type of data structure, for storing attributes discovered from the additional packets. Attributes may include a frequency field corresponding to each attributed that indicates how many of the processed packets include the attribute (e.g., as a number of packets having the attribute out of a total number of packets processed should exact numbers be necessary, as a percentage, or otherwise). The information in that field may then be used for the threshold determination(s) discussed above.

In some examples, packet handler 101 may continue to process network traffic using attributes 121, which now include the additional attributes added by packet handler 101 above, to continue to identify network packet traffic described by attributes 121. Likewise, while processing the network traffic, packet handler 101 may continue to identify additional attributes in the identified network packet traffic for addition to attributes 121. Essentially, steps 202-204 may continue to iterate so that attributes 121 more precisely define the packets being identified.

Figure 3:
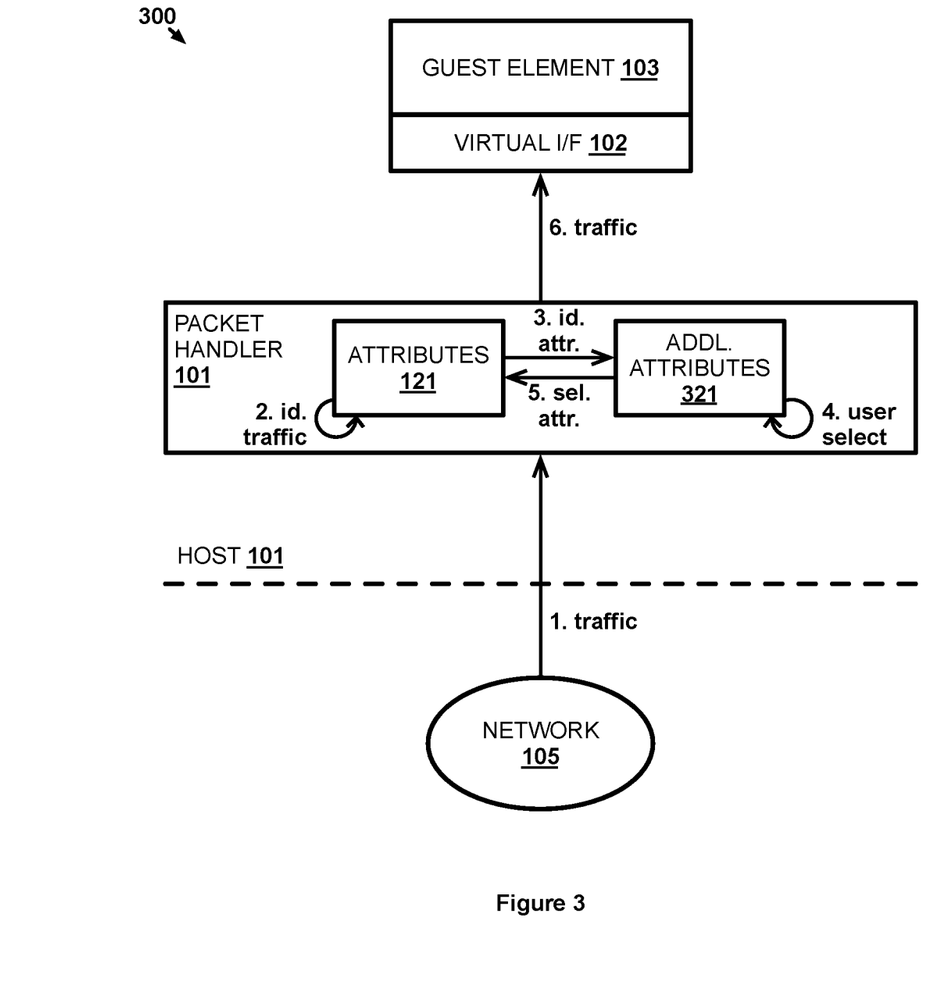
FIG. 3 illustrates another scenario for the implementation to enhance the attributes used for handling packets exchanged with micro segmented guests.

FIG. 3 illustrates scenario 300 for implementation 100 to enhance the attributes used for handling packets exchanged with micro segmented guests. Scenario 300 describes an example where network packet traffic from network 105 is directed towards guest 103 via virtualized interface 102. Packet handler 101 is placed in the data path all network packet traffic directed towards virtualized interface 102. This placement allows packet handler 101 to process all of the network packet traffic directed towards virtualized interface 102. In particular, guest 103 has been micro segmented into a particular micro segmentation group. That micro segmentation group is assigned one or more network policies for network packet traffic being exchanged with the guest 103. For instance, the policies may indicate that guests in the micro segmentation group of guest 103 can only exchange packets with guests in a particular other micro segmentation group. Regardless of the policies enacted for guest 103's micro segmentation group, packet handler 101 is provided with attributes 121 that describe packets to which one or more of the network policies should apply so that packet handler 101 can identify the described packets from network packet traffic.

Scenario 300 begins with packet handler 101 receiving network packet traffic at step 1 from network 105. As such, the network packet traffic may have been transferred from another guest on another host over network 105 or from some other type of networked computing system. Packet handler 101 identifies packets of the network packet traffic to which the network policies will be applied at step 2 based on attributes 121. From the packets identified at step 2, packet handler 101 identifies additional attributes 321 at step 3 within the identified packets that are shared by the identified packets. Additional attributes 321 may be shared by all the identified packets or may be shared by less than all of the identified packets in some cases. In those latter cases, a threshold percentage may be employed to determine whether the attributes shared by less than all the identified packets should be included in additional attributes 321. For example, the threshold may indicate that an attribute must be included in at least 90% of the identified packets for inclusion in additional attributes 321.

In scenario 300, rather than automatically adding additional attributes 321 to attributes 121 automatically, packet handler 101 receives a user selection at step 4 that identifies which of additional attributes 321 the user would like to have included in attributes 121. Packet handler 101 may be in communication with the user's workstation to present the user with additional attributes 321 and receive the user's input indicating the selection of additional attributes 321. The user may select all of the additional attributes 321, may select some number of the attributes less than all of additional attributes 321, or may select none of additional attributes 321. The user may choose not to select a particular attribute of additional attributes 321 due to the user determining that the attribute is not indicative of other packets that may need to be identified by packet handler 101 (e.g., packets that may be received by packet handler 101 in the future that will be different from the packets processed by packet handler 101 to identify additional attributes 321). Although, the user may select or not select particular attributes of additional attributes 321 for any reason the user sees fit. The user may be notified each time another one of additional attributes 321 is identified, may be notified periodically of any additional attributes 321 that were identified in the preceding period of time, the user may manually check for additional attributes 321, or the user may be provided with additional attributes 321 on some other schedule.

Packet handler 101 adds the selected attributes of additional attributes 321 to attributes 121 at step 5. Once included in attributes 121, the added attributes are used by packet handler 101 to identify packets of the network packet traffic just like any other of attributes 121. Packets of the network packet traffic that are identified by packet handler 101 using attributes 121 and are allowed to reach guest 103 in accordance with the network policy associated therewith, are passed from packet handler 101 to virtualized interface 102 at step 6.

Figure 4:
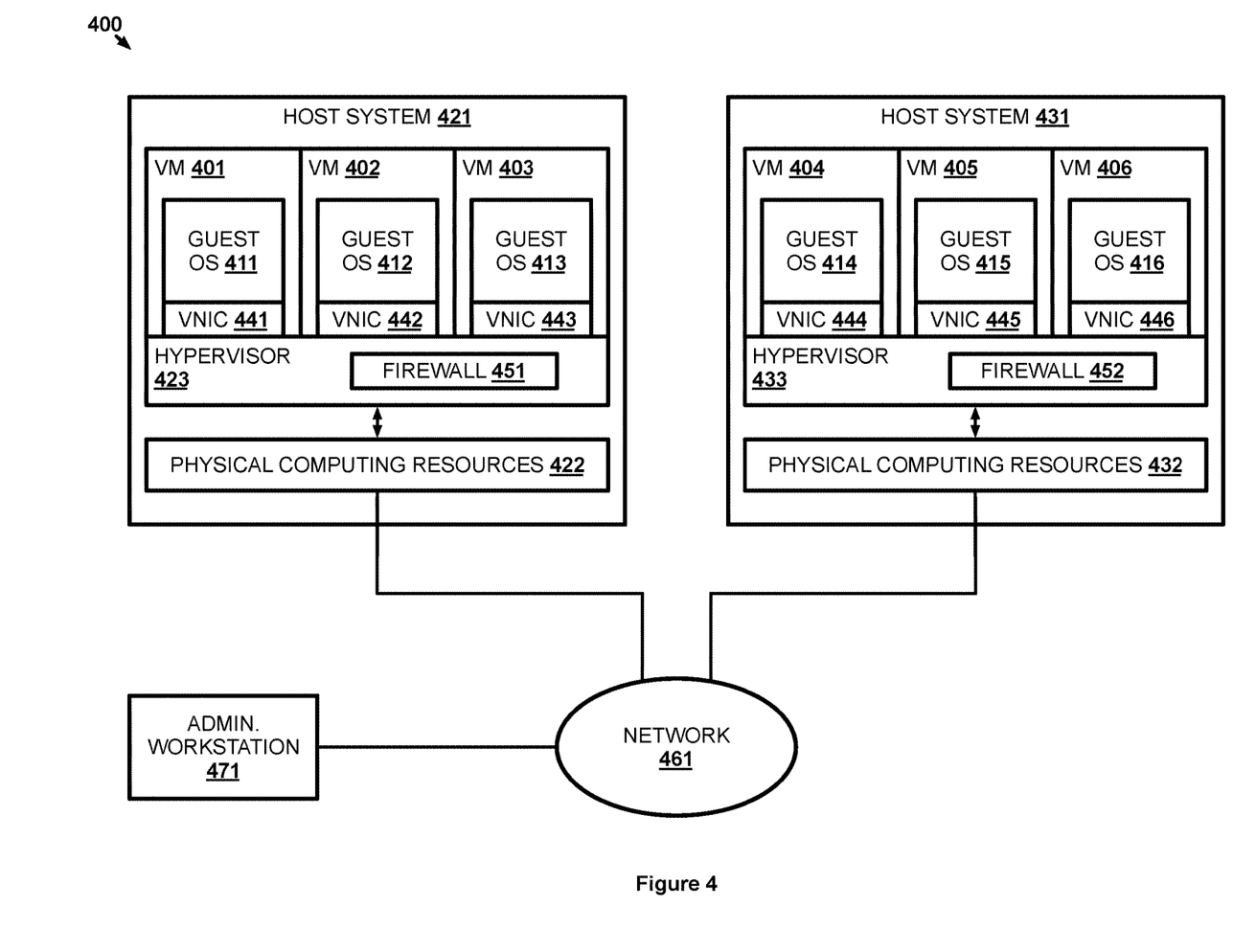
FIG. 4 illustrates another implementation for enhancing the attributes used for handling packets exchanged with micro segmented guests.

FIG. 4 illustrates implementation 400 for enhancing the attributes used for handling packets exchanged with micro segmented guests. Implementation 400 includes host computing system 421, host computing system 431, network 461 and administrator workstation 471. Network 461 may include the Internet, one or more local area networks, one or more wide area networks, and/or one or more other types of networks between computing systems. Administrator workstation 471 may be a personal computer operated by a user who is an administrator of host computing system 421, physical computing resources 422, and network 461. Administrator workstation 471 may also be another type of device, such as a mobile phone or tablet computing device.

In this example, host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 and hypervisor 433 include distributed firewall instance 451 and distributed firewall instance 452, respectively. Distributed firewall instance 451 and distributed firewall instance 452 are packet handlers that virtualize the functions of a physical network firewall system for virtual machines provided by hypervisor 423 and hypervisor 433, respectively. Collectively, distributed firewall instance 451 and distributed firewall instance 452 may be referred to as a distributed firewall since firewall functions are distributed between multiple hosts. Additionally, hypervisor 423 provides one of VNICs 441-443 to each respective virtual machine 401-403 and hypervisor 433 provides one of VNICs 444-446 to each respective virtual machine 404-406. Guest operating systems (OSs) 411-416 executing within virtual machines 401-406 use the respective VNICs 441-446 to exchange network communications.

It should be understood that the distribution of virtual machines evenly across two host computing systems, as shown in FIG. 4, is merely exemplary. The six virtual machines shown may instead be implemented on any number of host computing systems. Likewise, host computing systems 421 and 431 could host additional hosts (e.g., hypervisors) and virtual machines and/or other virtual elements that are not involved in this example.

Figure 5:
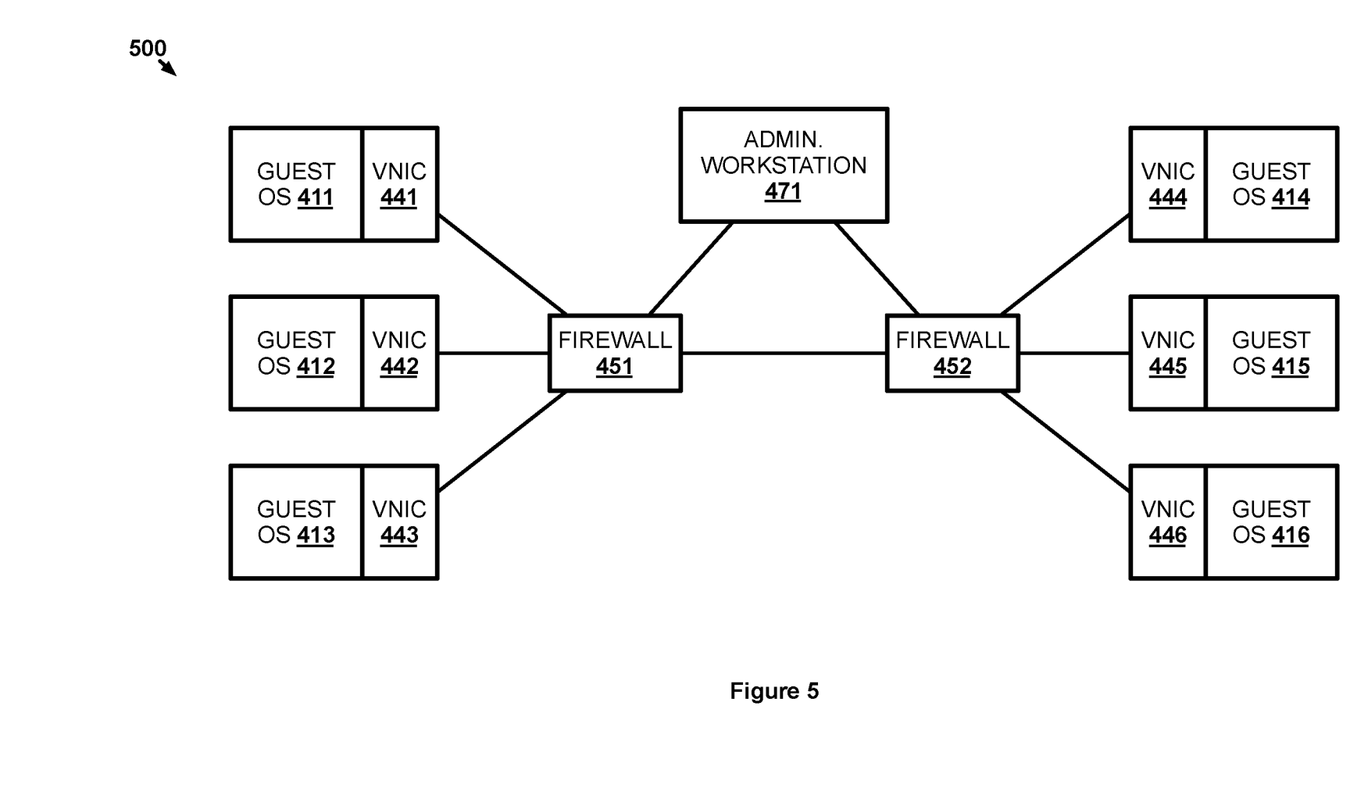
FIG. 5 illustrates a logical arrangement of the other implementation for enhancing the attributes used for handling packets exchanged with micro segmented guests.

FIG. 5 illustrates logical arrangement 500 of the other implementation for enhancing the attributes used for handling packets exchanged with micro segmented guests. Logical arrangement 500 shows paths by which packet communications from each of guest OSs 411-413 are routed to guest OSs 414-416 and in the reverse direction. Packets pass from a guest OS to a VNIC and then through a distributed firewall instance before being routed to a destination. For example, packets from guest OS 411 are passed to VNIC 441 and then to distributed firewall instance 451. From distributed firewall instance 451, the packets may be passed to VNIC 442 or VNIC 443 if guest OS 412 or guest OS 413 is the packets' destination, or may be passed to distributed firewall instance 452 for distribution to one of VNICs 444-446 if guest OS 414, guest OS 415, or guest OS 416 is the packet's destination. While not shown, a virtual switch may be implemented by hypervisors 423 and 433 between their respective VNICs and distributed firewall instances. Additionally, the present example includes one distributed firewall instance per hypervisor, although other examples may include additional instances. For example, a distinct distributed firewall instance may be executed for each respective VNIC.

Administrator workstation 471 is shown in direct communication with distributed firewall instance 451 and distributed firewall instance 452 for the purposes of logical arrangement 500. In other examples, a separate firewall management component, such as a control plane executing within its own virtual machine, may communicate with distributed firewall instance 451 and distributed firewall instance 452. In those examples, administrator workstation 471 may communicate with the firewall management component as an intermediary between administrator workstation 471 and distributed firewall instance 451 and distributed firewall instance 452.

Figure 6:
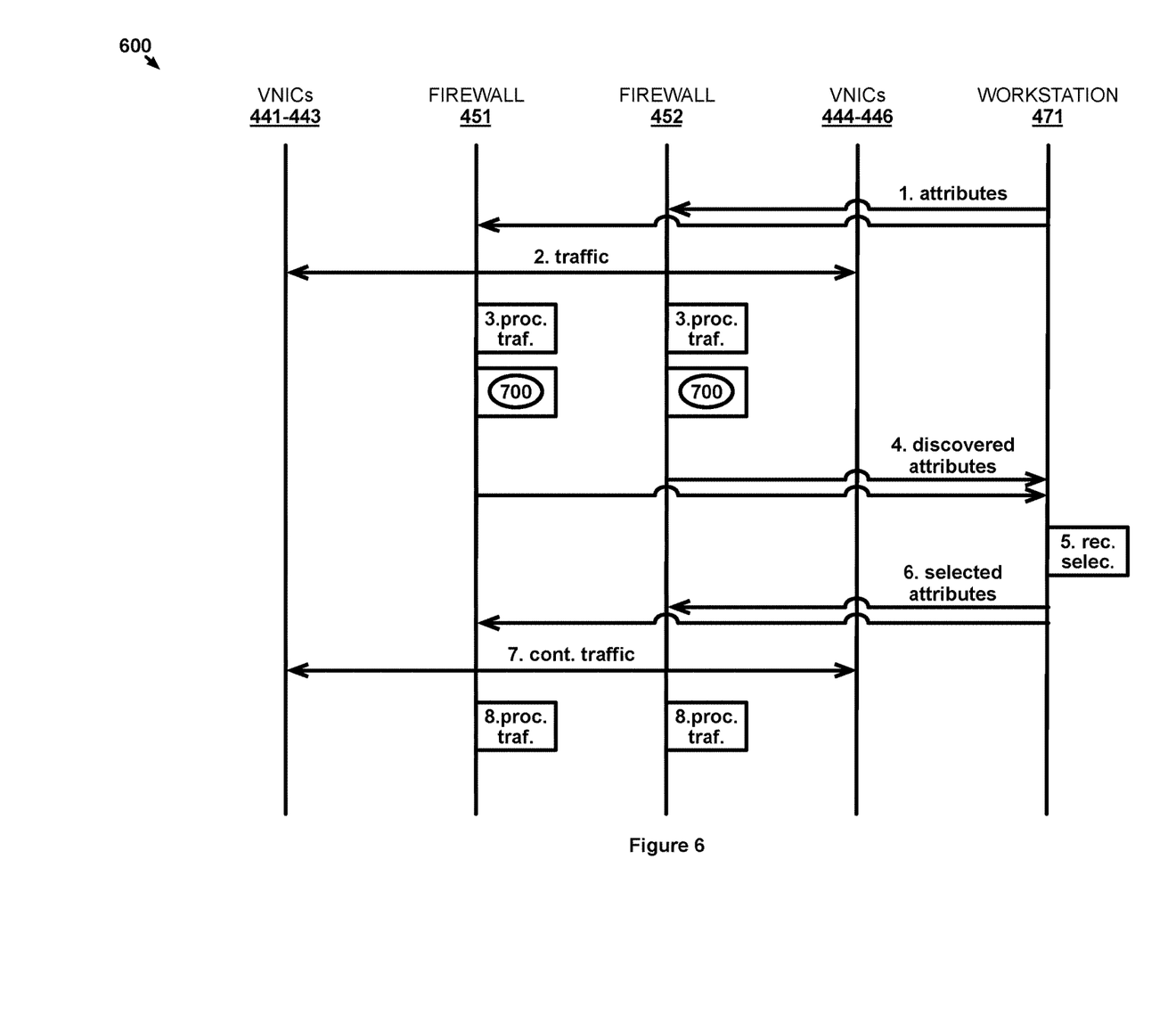
FIG. 6 illustrates a scenario for the other implementation to enhance the attributes used for handling packets exchanged with micro segmented guests.

FIG. 6 illustrates scenario 600 for implementation 400 to enhance the attributes used for handling packets exchanged with micro segmented guests. Scenario 600 begins with distributed firewall instance 451 and distributed firewall instance 452 each receiving attributes at step 1 from administrator workstation 471. The attributes may be entered via user input from a user into administrator workstation 471, although administrator workstation 471 may obtain the attributes in some other manner. The attributes define packet that should be allowed to pass distributed firewall instance 451 and/or distributed firewall instance 452 and reach each respective VNICs 441-446 and their corresponding guest OSs 411-416. Each guest OS may be in the same micro segmentation group, may each be in a different micro segmentation group, or may be distributed amongst the micro segmentation groups in some other way. The attributes may be different for different micro segmentation groups. Thus, packets identified as being allowed to pass the firewall using the attributes corresponding to one micro segmentation group may not be identified as packets that are allowed to pass the firewall using the attributes corresponding to another micro segmentation group.

Figure 7:
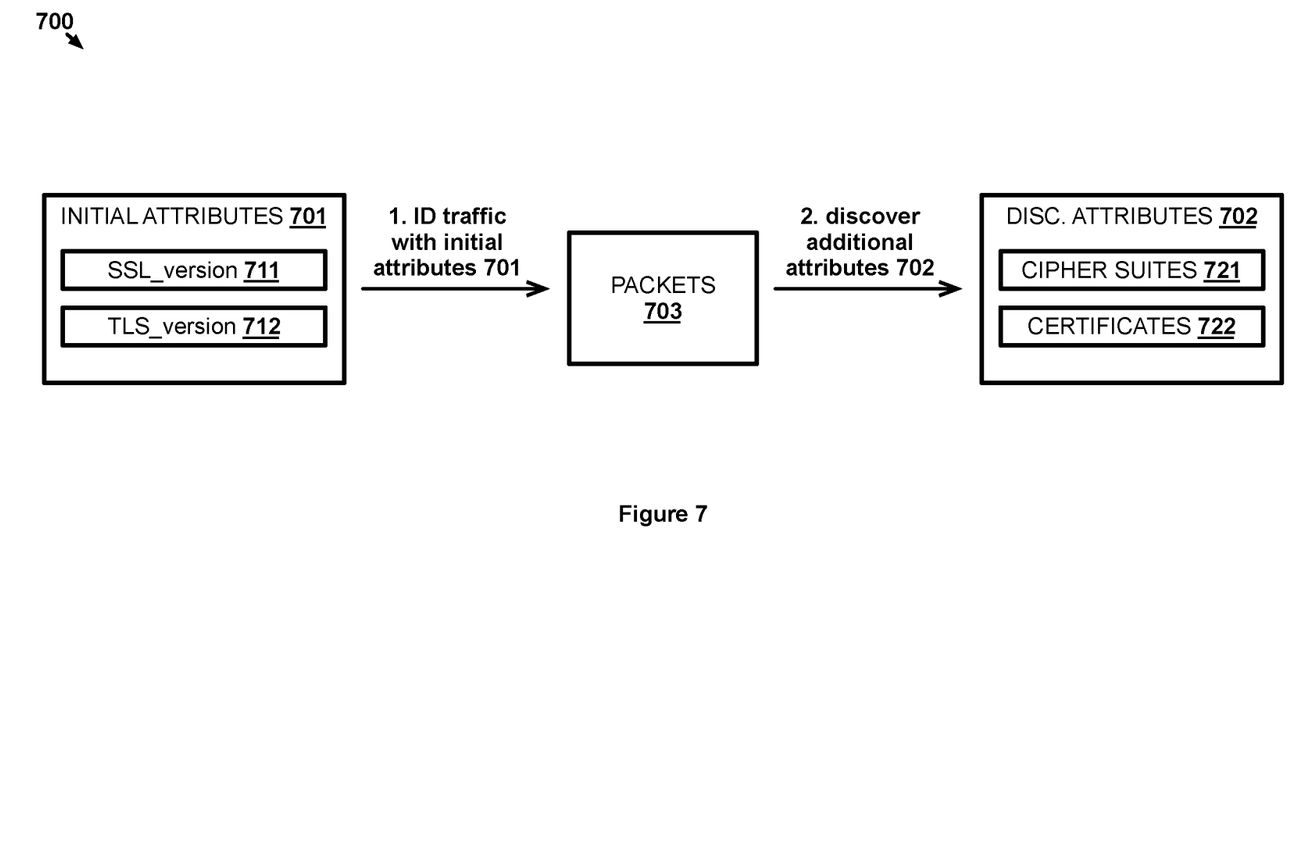
FIG. 7 illustrates another scenario for the other implementation to enhance the attributes used for handling packets exchanged with micro segmented guests.

Once initial attributes are received by distributed firewall instance 451 and distributed firewall instance 452, distributed firewall instance 451 and distributed firewall instance 452 start receiving at step 2 and processing at step 3 network packet traffic being exchanged between guest OSs 411-416 via their respective VNICs 441-446. Processing the traffic includes distributed firewall instance 451 and distributed firewall instance 452 determining to which of guest OSs 411-416 each packet of the network packet traffic is destined (e.g., identifying the destination network address of each packet) and determining into which micro segmentation group the destination guest OS is placed. Attributes corresponding to the micro segmentation group of the packet's destination are applied to the packet to determine whether the packet should be allowed to pass to that destination. If the packet satisfies the attributes, then the packet is allowed to pass. Otherwise, the packet is blocked from reaching the packet's destination. From the packets that are determined to be allowable to pass distributed firewall instance distributed firewall instance 451 and distributed firewall instance 452, distributed firewall instance distributed firewall instance 451 and distributed firewall instance 452 each performs in accordance with scenario 700.

FIG. 7 illustrates scenario 700 of implementation 400 to enhance the attributes used for handling packets exchanged with micro segmented guests. Scenario 700 includes initial attributes 701, which are an example of the attributes initially received from the user at step 1 of scenario 600. Initial attributes 701 apply to a particular micro segmentation group into which one or more of guest OSs 411-416 may be grouped. Initial attributes 701 indicate SSL_version 711 and TLS_version 712, which are identifiers for applications allowed to pass packet traffic into guest OSs of the micro segmentation group associated with initial attributes 701. In particular, SSL_version 711 indicates an SSL version (or a minimum SSL version) required for packets to be considered allowable. Likewise, TLS_version 712 indicates a TLS version (or a minimum TLS version) required for packets to be considered allowable. In this example, initial attributes 701 are attributes of the packets that are relatively easy for a user to determine and decide are relevant to packet traffic that should be allowed to pass through distributed firewall instance distributed firewall instance 451 and distributed firewall instance 452 to guest OSs in the micro segmentation group associated with initial attributes 701.

Initial attributes 701 are used to identify packets 703 at step 1 of scenario 700, which may be performed as at least part of step 3 from scenario 600 to identify packets that are allowed to pass through distributed firewall instance 451 and distributed firewall instance 452. Thus, packets 703 are packets of the network packet traffic that are allowed to pass through distributed firewall instance 451 and distributed firewall instance 452 to guest OSs in the micro segmentation group associated with initial attributes 701. Packets 703 are then further processed to discover discovered attributes 702, which are additional attributes shared amongst packets 703. In this example, discovered attributes 702 includes cipher suites 721 and certificates 722 used with packets 703. Cipher suites 721 identifies the cipher suites used to secure packets 703 and certificates 722 are digital certificates that are used to confirm the authenticity of packets 703. DPI may be used by distributed firewall instance 451 and distributed firewall instance 452 when discovering additional attributes of packets 703.

Referring back to scenario 600, distributed firewall instance 451 and distributed firewall instance 452 transfer discovered attributes 702 at step 4 to administrator workstation 471 and administrator workstation 471 presents (e.g., displays) discovered attributes 702 to a user of administrator workstation 471. Once the user is aware of discovered attributes 702 from the presentation of discovered attributes 702, the user selects at step 5 which of discovered attributes 702 the user would like added to initial attributes 701 to enhance initial attributes 701. The user may determine to select any number of the attributes from none to all for inclusion into initial attributes 701. Once the user has made their selections, administrator workstation 471 notifies distributed firewall instance 451 and distributed firewall instance 451 at step 6 of the selected attributes and distributed firewall instance 451 and distributed firewall instance 452 add the selected attributes to initial attributes 701.

As distributed firewall instance 451 and distributed firewall instance 452 continue to receive network packet traffic at step 7, distributed firewall instance 451 and distributed firewall instance 452 process the packet traffic at step 8 using the newly added to attributes. For example, if all of discovered attributes 702 were selected by the user, the distributed firewall instance 451 and distributed firewall instance 452 would be identifying packet traffic with SSL_version 711, TLS_version 712, cipher suites 721, and certificates 722. As distributed firewall instance 451 and distributed firewall instance 452 continue to receive and process the network packet traffic, distributed firewall instance 451 and distributed firewall instance 452 may continue to discover additional attributes that the user may select for addition to the attributes already in use. It should be understood that, while scenario 600 and scenario 700 are described with respect to both distributed firewall instance 451 and distributed firewall instance 452 using the described attributes associated with a particular micro segmentation group, it is possible that one of distributed firewall instance 451 and distributed firewall instance 452 may not handle any traffic for that micro segmentation group. In those cases, only one of distributed firewall instance 451 and distributed firewall instance 452 would operate in accordance with scenario 600 and scenario 700. Advantageously, the above implementations allow for packet identification attributes to be enhanced with additional attributes that may have been unknown to the user, unable to be obtained by the user at the time the user defined the attributes, or not provided by the user for some other reason.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of enhancing attributes for micro segmentation, the method comprising:
receiving a plurality of attributes from a user, wherein the plurality of attributes describes first network packet traffic that should be handled in a first manner and include attributes in a layer of the first network packet traffic lower than an application layer;
processing network packet traffic to identify the first network packet traffic using the plurality of attributes;
while processing the network packet traffic, identifying one or more additional attributes shared among the first network packet traffic, wherein the one or more additional attributes comprise attributes in the application layer of the first network packet traffic;
adding at least a portion of the one or more additional attributes to the plurality of attributes; and
after adding at least the portion of the one or more additional attributes to the plurality of attributes, continuing to process the network packet traffic to identify the first network packet traffic using the plurality of attributes.

2. The method of claim 1, further comprising:
presenting the one or more additional attributes to the user; and
receiving a selection from the user indicating at least the portion of the one or more attributes.

3. The method of claim 1, wherein the first network packet traffic is associated with one or more applications.

4. The method of claim 3, wherein the plurality of attributes, when received from the user, includes an application identifier for each of the one or more applications.

5. The method of claim 4, wherein the application identifier comprises an identifier of one or more protocols used for the first network packet traffic, wherein one or more protocols include one or more of Secure Sockets Layer (SSL), Secure Shell (SSH), Domain Name System (DNS) protocol, and Dynamic Host Configuration Protocol (DHCP).

6. The method of claim 5, wherein the one or more additional attributes include one or more of a cipher suite and a security certificate.

7. The method of claim 1, further comprising:
using a portion of the one or more additional attributes to identify second network packet traffic that should be handled in a second manner different than the first manner.

8. The method of claim 7, wherein the first manner comprises allowing passage through a network firewall and the second manner comprises denying passage through the network firewall.

9. A system for enhancing attributes for micro segmentation, the system comprising:
one or more computer readable storage media;
a processing system, comprising processing circuitry, operatively coupled with the one or more computer readable storage media; and
program instructions stored on the one or more computer readable storage media that, when read and executed by the processing system, direct the processing system to:
receive a plurality of attributes from a user, wherein the plurality of attributes describes first network packet traffic that should be handled in a first manner and include attributes in a layer of the first network packet traffic lower than an application layer;
process network packet traffic to identify the first network packet traffic using the plurality of attributes;
while the network packet traffic is processed, identify one or more additional attributes shared among the first network packet traffic, wherein the one or more additional attributes comprise attributes in the application layer of the first network packet traffic;
add at least a portion of the one or more additional attributes to the plurality of attributes; and
after at least the portion of the one or more additional attributes is added to the plurality of attributes, continue to process the network packet traffic to identify the first network packet traffic using the plurality of attributes.

10. The system of claim 9, wherein the program instructions further direct the processing system to:

present the one or more additional attributes to the user; and receive a selection from the user indicating at least the portion of the one or more attributes.

11. The system of claim 9, wherein the first network packet traffic is associated with one or more applications.

12. The system of claim 11, wherein the plurality of attributes, when received from the user, includes an application identifier for each of the one or more applications.

13. The system of claim 12, wherein the application identifier comprises an identifier of one or more protocols used for the first network packet traffic, wherein one or more protocols include one or more of Secure Sockets Layer (SSL), Secure Shell (SSH), Domain Name System (DNS) protocol, and Dynamic Host Configuration Protocol (DHCP).

14. The system of claim 13, wherein the one or more additional attributes include one or more of a cipher suite and a security certificate.

15. The system of claim 9, wherein the program instructions further direct the processing system to:

use a portion of the one or more additional attributes to identify second network packet traffic that should be handled in a second manner different than the first manner.

16. The system of claim 15, wherein the first manner comprises allowing passage through a network firewall and the second manner comprises denying passage through the network firewall.

* * * * *